United States Patent
Lee et al.

(10) Patent No.: US 9,190,059 B2
(45) Date of Patent: Nov. 17, 2015

(54) ELECTRONIC DEVICE AND METHOD FOR CONTROLLING POWER USING VOICE RECOGNITION

(71) Applicant: SAMSUNG ELECTRONICS CO., LTD., Suwon-si (KR)

(72) Inventors: Ji-hyun Lee, Suwon-si (KR); Chang-joo Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 13/833,997

(22) Filed: Mar. 15, 2013

(65) Prior Publication Data

US 2013/0246071 A1 Sep. 19, 2013

Related U.S. Application Data

(60) Provisional application No. 61/611,175, filed on Mar. 15, 2012.

(30) Foreign Application Priority Data

May 21, 2012 (KR) .................. 10-2012-0053407

(51) Int. Cl.

| | |
|---|---|
| G10L 15/00 | (2013.01) |
| G10L 15/22 | (2006.01) |
| G10L 15/28 | (2013.01) |
| G10L 25/78 | (2013.01) |
| G06F 1/32 | (2006.01) |
| G10L 17/22 | (2013.01) |
| H04W 52/02 | (2009.01) |
| G10L 15/26 | (2006.01) |

(52) U.S. Cl.
CPC .............. *G10L 15/22* (2013.01); *G06F 1/3206* (2013.01); *G10L 15/28* (2013.01); *G10L 25/78* (2013.01); *H04W 52/0254* (2013.01); *G10L 15/265* (2013.01); *G10L 17/22* (2013.01); *H04M 2250/74* (2013.01); *H04W 52/02* (2013.01)

(58) Field of Classification Search
None
See application file for complete search history.

(56) References Cited

U.S. PATENT DOCUMENTS

| | | | | |
|---|---|---|---|---|
| 4,052,568 | A | * 10/1977 | Jankowski | .................... 704/233 |
| 5,226,090 | A | 7/1993 | Kimura | |
| 5,577,164 | A | * 11/1996 | Kaneko et al. | ................ 704/275 |
| 5,983,186 | A | * 11/1999 | Miyazawa et al. | ............ 704/275 |

(Continued)

FOREIGN PATENT DOCUMENTS

WO 2012025784 A1 3/2012

OTHER PUBLICATIONS

Communication, dated Jul. 23, 2013, issued by the European Patent Office, in counterpart Application No. 13155235.8.

(Continued)

*Primary Examiner* — Daniel Abebe
(74) *Attorney, Agent, or Firm* — Sughrue Mion, PLLC

(57) ABSTRACT

An electronic apparatus and a power controlling method are provided. The electronic apparatus includes: a voice input unit which receives an audio input in a stand-by mode of the electronic apparatus; a voice sensing unit which determines whether the received audio input is a user voice, and if the user voice is input, outputs a power control signal; and a power control voice recognition unit which, if the power control signal is received from the voice recognition unit, turns on and performs voice recognition regarding the input user voice.

17 Claims, 3 Drawing Sheets

(56) References Cited

U.S. PATENT DOCUMENTS

| | | | |
|---|---|---|---|
| 6,070,140 A * | 5/2000 | Tran | 704/275 |
| 6,324,514 B2 * | 11/2001 | Matulich et al. | 704/275 |
| 7,418,392 B1 | 8/2008 | Mozer et al. | |
| 7,774,204 B2 * | 8/2010 | Mozer et al. | 704/275 |
| 2001/0000534 A1 * | 4/2001 | Matulich et al. | 704/275 |
| 2002/0116196 A1 * | 8/2002 | Tran | 704/270 |
| 2006/0287864 A1 * | 12/2006 | Pusa et al. | 704/275 |
| 2013/0289994 A1 * | 10/2013 | Newman et al. | 704/254 |

OTHER PUBLICATIONS

Communication dated May 16, 2014 issued by the European Patent Office in counterpart European Patent Application No. 13155235.8.

* cited by examiner

ELECTRONIC DEVICE AND METHOD FOR CONTROLLING POWER USING VOICE RECOGNITION

CROSS-REFERENCE TO RELATED APPLICATIONS

This application claims the benefit of U.S. Provisional Application No. 61/611,175, filed on Mar. 15, 2012 in the United States Patents and Trademark Office, and Korean Patent Application No. 2012-0053407, filed on May 21, 2012 in the Korean Intellectual Property Office, the disclosures of which are incorporated herein by reference in their entireties.

BACKGROUND

1. Field

Apparatuses and methods consistent with exemplary embodiments relate to an electronic apparatus and a method for controlling power, and more particularly, to an electronic apparatus for controlling power of the electronic apparatus using voice recognition and a method for controlling power thereof.

2. Description of the Related Art

With the development of electronic technology, methods for controlling an electronic apparatus in various ways have been developed. In a related art, an electronic apparatus has been controlled using buttons on the electronic apparatus or a remote controller which is provided separately from the electronic apparatus.

However, if an electronic apparatus is controlled using buttons on the electronic apparatus or a remote controller which is provided separately from the electronic apparatus as in the related art technology, users have to carry the electronic apparatus or the remote controller frequently, causing inconvenience to the users. In particular, if the users are in a situation where it is difficult to carry the electronic apparatus or the remote controller (for example, if hands are dirty, or if it is hard to locate the remote controller), the users may experience an inconvenience in controlling the electronic apparatus.

Recently, new technologies using voice recognition and motion recognition have been developed to resolve the above-described problems. In particular, a method for controlling an electronic apparatus using voice recognition so as to control the electronic apparatus even though a remote controller is far away has become popular.

However, in the related art technology of controlling power of an electronic apparatus using voice recognition, a voice recognition module of the electronic apparatus should be turned on all the time even in a stand-by mode, wasting considerable amount of power in the stand-by mode.

SUMMARY

Aspects of one or more exemplary embodiments relate to an electronic apparatus which turns on power of a voice recognition unit of the electronic apparatus when a user voice is recognized through the voice sensing unit in a stand-by mode and a method for controlling power thereof so as to prevent wasting power unnecessarily in the stand-by mode.

According to an aspect of an exemplary embodiment, there is provided an electronic apparatus including: a voice input unit which receives an audio; a voice sensing unit which senses whether a user voice is input through the voice input unit in a stand-by mode of the electronic apparatus, and if the user voice is input, outputs a first power control signal; and a power control voice recognition unit which, if the first power control signal is received from the voice recognition unit, turns on power and performs voice recognition regarding the input user voice.

The power control voice recognition unit may recognize the input voice and determine whether the input voice is a voice to control power of the electronic apparatus.

The apparatus may further include a main control unit which controls the electronic apparatus, and the power control voice recognition unit may transmit a second power control signal to the main control unit if it is determined that the input voice is the voice to control the power of the electronic apparatus, and the main control unit may convert a mode of the electronic apparatus from the stand-by mode into an operation mode if the second power control signal is received from the power control voice recognition unit.

The power control voice recognition unit may turn off power of the power control voice recognition unit again after a predetermined time elapses upon determining that the input voice is the user voice to control the power of the electronic apparatus.

The apparatus may further include a main voice recognition unit which recognizes a user voice received through the voice input unit, and the main control unit may control the electronic apparatus according to the user voice recognized through the main voice recognition unit in the operation mode.

The power control voice recognition unit may turn off power again if a user voice is not input again for a predetermined time upon determining that the input voice is not the user voice to control the power of the electronic apparatus.

The power control voice recognition unit may store only a command corresponding to the user voice to control the power of the electronic apparatus.

The voice sensing unit may sense that the user voice is input when a volume of the audio received through the voice input unit increases by more than a predetermined value in comparison with a volume of a previously-input audio.

Only the voice input unit and the voice sensing unit may be turned on in the stand-by mode of the electronic apparatus.

According to an aspect of another exemplary embodiment, there is provided a method for controlling power of an electronic apparatus, the method including: sensing whether a user voice is input in a stand-by mode of the electronic apparatus by a voice recognition unit; if the user voice is sensed, transmitting a first power control signal to a power control voice recognition unit by the voice sensing unit; and if the first power control signal is received from the voice sensing unit, turning on power by the power control voice recognition unit and performing voice recognition regarding the input user voice.

The method may further include determining whether the input voice is a user voice to control the power of the electronic apparatus by recognizing the input voice by the power control voice recognition unit.

The method may further include, if it is determined that the input voice is the user voice to control the power of the electronic apparatus, transmitting a second power control signal to a main control unit by the power control voice recognition unit, and if the second power control signal is received from the power control voice recognition unit, converting a mode of the electronic apparatus from the stand-by mode to an operation mode by the main control unit.

The method may further include, upon determining that the input voice is the user voice to control the power of the electronic apparatus, turning off power of the power control voice recognition unit again after a predetermined time elapses.

The method may further include controlling the electronic apparatus according to a user voice recognized through a main voice recognition unit in the operation mode by the main control unit.

The method may further include, if it is determined that the input voice is not the user voice to control the power of the electronic apparatus and a user voice is not input again for a predetermined time, turning off power of the power control voice recognition unit again.

The power control voice recognition unit may store only a command corresponding the user voice to control the power of the electronic apparatus.

The sensing may include sensing that the user voice is input when a volume of the audio received through a voice input unit increases by more than a predetermined value in comparison with a volume of a previously-input audio.

Only the voice input unit and the voice sensing unit may be turned on in the stand-by mode of the electronic apparatus.

According to an aspect of another exemplary embodiment, there is provided a method for controlling power of an electronic apparatus, the method including: in response to determining that a received audio input corresponds to a predetermined sound, powering a power control voice recognition unit of the electronic apparatus; and in response to the powering of the power control voice recognition, performing voice recognition regarding the received audio input.

BRIEF DESCRIPTION OF THE DRAWINGS

These and/or other aspects and advantages will become apparent and more readily appreciated from the following description of exemplary embodiments, taken in conjunction with the accompanying drawings, of which.

DETAILED DESCRIPTION OF EXEMPLARY EMBODIMENTS

Figure 1:
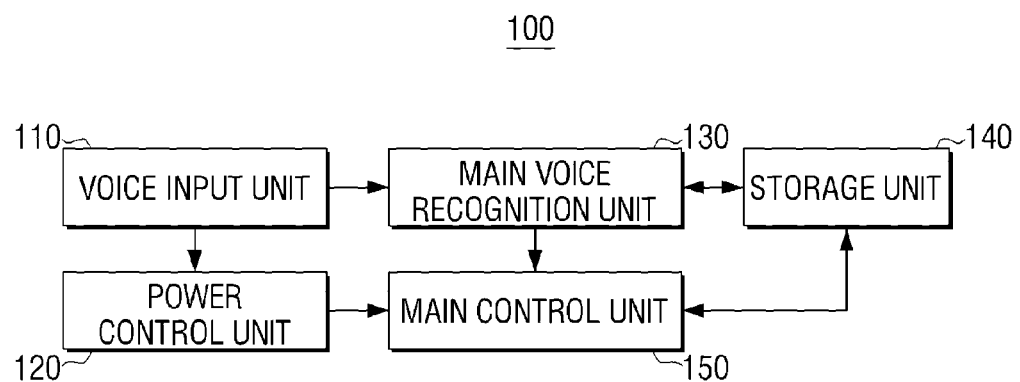
FIG. 1 is a block diagram illustrating configuration of an electronic apparatus according to an exemplary embodiment.

Reference will now be made in detail to exemplary embodiments, examples of which are illustrated in the accompanying drawings, wherein like reference numerals refer to like elements throughout. The embodiments are described below, in order to explain the present invention by referring to the figures.

FIG. 1 is a block diagram briefly illustrating configuration of an electronic apparatus 100 according to an exemplary embodiment. As illustrated in FIG. 1, the electronic apparatus 100 includes a voice input unit 110, a power control unit 120, a main voice recognition unit 130, a storage unit 140, and a main control unit 150. The electronic apparatus 100 according to an exemplary embodiment may be a television, but this is only an example. The electronic apparatus 100 may be various electronic apparatus such as a smart phone, a tablet PC, a notebook, a desktop, a personal digital assistant (PDA), a workstation, a special-purpose computer, a set-top box, a digital multimedia reproduction apparatus, a gaming device, a display device, a projector device, etc.

The voice input unit 110 receives audio input from outside. In this case, the voice input unit 110 may receive not only a user voice, but also various types of audio (for example, an inside noise).

In particular, the voice input unit 110 converts an input audio signal into an electrical signal and transmits the converted electrical signal to the power control unit 120 or the main voice recognition unit 130. If the electronic apparatus 100 is in a stand-by mode, the voice input unit 110 may transmit the converted electrical signal to the power control unit 120, and if the electronic apparatus 100 is in an operation mode, the voice input unit 110 may transmit the converted electrical signal to the main voice recognition unit 130. Herein, the stand-by mode of the electronic apparatus 100 may be a reduced power mode, e.g., a mode to wait for a user's command to turn on the electronic apparatus 100 while power is not applied to any other elements except for the power control unit 120. Furthermore, the operation mode may be a mode to control the electronic apparatus 100 upon the user's command by applying power to the main control unit 150 of the electronic apparatus 100.

In this case, the voice input unit 110 may be realized as a microphone either in the form of an all-in-one with (e.g., integral with) or separate from the electronic apparatus 100. The voice input unit 100 which is provided separate from the electronic apparatus 100 may be connected to the electronic apparatus 100 via cable or a wireless connection (e.g., infrared, Bluetooth, wireless network, etc.).

The power control unit 120 controls a power state of the electronic apparatus 100. In this case, the power control unit 120 may control a power state of the electronic apparatus 100 in various ways. In particular, the power control unit 120 may control a power state of the electronic apparatus 100 by recognizing a user voice. The specific method through which the power control unit 120 controls a power state of the electronic apparatus using a user voice will be explained in detail with reference to FIG. 2.

Figure 2:
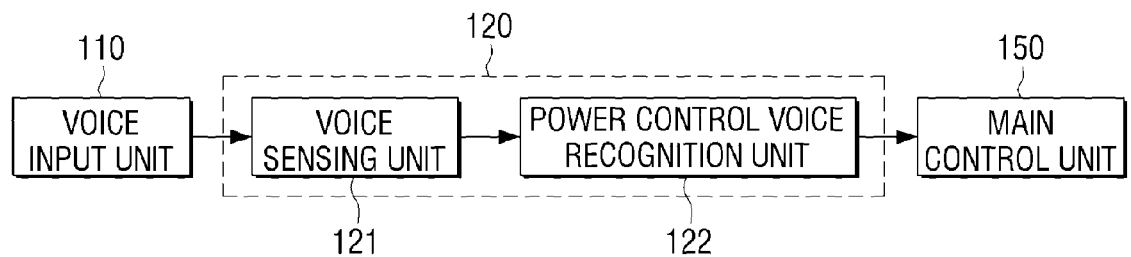
FIG. 2 is a block diagram illustrating configuration of a power control unit of an electronic apparatus in detail according to an exemplary embodiment.

FIG. 2 is a block diagram illustrating a configuration of a power control unit 120 of an electronic apparatus 100 according to an exemplary embodiment. As illustrated in FIG. 2, the power control unit 120 includes a voice sensing unit 121 and a power control voice recognition unit 122.

If the electronic apparatus 100 is in a stand-by mode, the voice sensing unit 121 senses whether an audio input through the voice input unit 110 is a user voice or not. The voice sensing unit 121 is turned on even if the electronic apparatus 100 is in the stand-by mode.

In this case, if a volume of an audio received through the voice input unit 110 increases by more than a predetermined value in comparison with previously-input audio, the voice sensing unit 121 may determine that a user voice is input. In a general household environment or a general office environment, various types of audio other than a user voice may be input to the voice input unit 110. As noises in a general household environment or a general office environment (for example, noise of an air conditioner) have a certain volume, the voice sensing unit 121 may determine that a user voice is input only when a currently-input audio has a volume which increases by more than a predetermined value in comparison with a usually-input audio (for example, a general noise). For instance, if the volume of an ordinary audio is 20 dB, the audio recognition unit 121 may determine that only an audio having a volume larger than the volume of a usually-input audio by more than a predetermined value (for example, 12 dB) is a user voice. However, it is understood that one or more other exemplary embodiments are not limited thereto. For example, according to another exemplary embodiment, the audio recognition unit 121 may determine that a user voice is input when a currently-input audio has a volume that is greater than a predetermined value.

If the voice sensing unit 121 determines that a user voice is input, the voice sensing unit 121 transmits a power control signal to the power control voice recognition unit 122.

The power control voice recognition unit 122 is turned off in the stand-by mode of the electronic apparatus 100. If a power control signal is received from the voice sensing unit 121, the power control voice recognition unit 122 is turned on. The power of the power control voice recognition unit 122 is turned off in a stand-by mode, and the power of the power control voice recognition unit 122 is turned on when a power control signal is received from the voice sensing unit 121. Thus, unnecessary power consumption in the stand-by mode may be prevented.

Subsequently, the power control voice recognition unit 122 receives an electrical signal corresponding to the sensed user voice from at least one of the voice input unit 110 and the voice sensing unit 121.

The power control voice recognition unit 122 performs voice recognition using an electrical signal corresponding to the received user voice. Specifically, the power control voice recognition unit 122 recognizes a voice using a voice recognition module and voice data based in the power control voice recognition unit 122. In this case, a command only for controlling the power of the electronic apparatus 100 may be stored in a voice database in the power control voice recognition unit 122. For example, commands to turn on the power of the electronic apparatus 100 such as "start", "turn-on" and "hi" may be stored in the voice database. However, it is understood that one or more other exemplary embodiments are not limited thereto, and other commands may be stored in the voice database.

Depending on the type of an input voice, voice recognition may be divided into isolated word recognition which recognizes an uttered voice by each word, continuous speech recognition which recognizes continuous words, continuous sentences, and conversational voice, and keyword spotting which is a recognition form between the isolated word recognition and the continuous speech recognition and detects and recognizes a predetermined keyword.

If a user voice is input, the power control voice recognition unit 122 determines a voice section by detecting the start and end of an uttered voice of a user within an input voice signal. The power control voice recognition unit 122 may calculate the energy of the input voice signal, categorize the energy level of the voice signal based on the calculated energy, and detect a voice section through dynamic programming. The power control voice recognition unit 122 generates phoneme data by detecting a phoneme, which is the basic unit of voice, from a voice signal within the detected voice section based on an acoustic model. The power control voice recognition unit 122 generates text information by applying a Hidden Markov Model (HMM) to the generated phoneme data. However, it is understood that the above method for recognizing a user voice is only an exemplary embodiment, and a user voice may be recognized using other ways in one or more other exemplary embodiments.

The power control voice recognition unit 122 determines whether a user voice is for controlling the power of the electronic apparatus 100 based on the recognition result of the user voice. Specifically, the power control voice recognition unit 122 may determine whether the recognized user voice is for controlling the power of the electronic apparatus 100 by searching whether the recognized user voice is stored in the voice database to control the power.

If an input user voice is for controlling the power of the electronic apparatus 100, the power control voice recognition unit 122 transmits a power control signal to the main control unit 150.

If a user voice to control the power of the electronic apparatus 100 is not input for a predetermined time, the power control voice recognition unit 122 may be turned off again.

Alternatively, if an input user voice is not for controlling the power of the electronic apparatus 100, the power control voice recognition unit 122 may wait for a user voice to control the power of the electronic apparatus 100 to be input for a predetermined time (for example, 30 seconds) and if the user voice is not input after the predetermined time, the power control voice recognition unit 122 may be turned off again.

As described above, the power of the electronic apparatus 100 may be controlled using the power control unit 120 and thus, unnecessary consumption of power of the electronic apparatus 100 in the stand-by mode and in the operation mode may be prevented.

Meanwhile, the power control unit 120 may control power in various ways (for example, using a method of controlling power by selecting a button provided from outside) other than the above-described method of controlling power using a user voice.

Referring back to FIG. 1, the main voice recognition unit 130 recognizes a user voice input from the voice input unit 110 and transmits the recognition result to the main control unit 150. As described above, the main voice recognition unit 130 may recognize a user voice which is input from the voice input unit 110 in the operation mode of the electronic apparatus 100.

The method of recognizing a user voice by the main voice recognition unit 130 is similar to the method of recognizing a user voice by the power control voice recognition unit 122 and thus, a detailed description thereof will not be provided. The main voice recognition unit 130 may have an internal voice recognition module and a voice database just like the power control voice recognition unit 122, but this is only an example and one or more other exemplary embodiments are not limited thereto. For example, according to another exemplary embodiment, the main voice recognition unit 130 may perform voice recognition using a voice database stored in the external storage unit 140.

The storage unit 140 may store various programs and data to drive the electronic apparatus 100. In addition, the storage unit 140 may store a voice recognition module and a voice database to recognize a voice input through the voice input unit 110. In this case, the voice database may be matched with a pre-set voice and a task of the electronic apparatus 100 and stored in the storage unit 140.

The main control unit 150 is turned on by a power control signal transmitted from the power control voice recognition unit 122 of the power control unit 120. Accordingly, the main control unit 150 converts the stand-by mode of the electronic apparatus 100 to an operation mode.

The main control unit 150 controls the electronic apparatus 100 according to a user voice and various user inputs (for example, a touch input and a remote controller input) input through the voice input unit 110 in an operation mode.

Meanwhile, the main voice recognition unit 130 and the main control unit 150 may be realized as separate chips, but this is only an example and one or more other exemplary embodiments are not limited thereto. For example, the main voice recognition unit 130 and the main control unit 150 may be realized as a single chip.

Hereinafter, a method of controlling power of the electronic apparatus 100 using voice recognition will be explained with reference to FIGS. 3 and 4.

Figure 3:
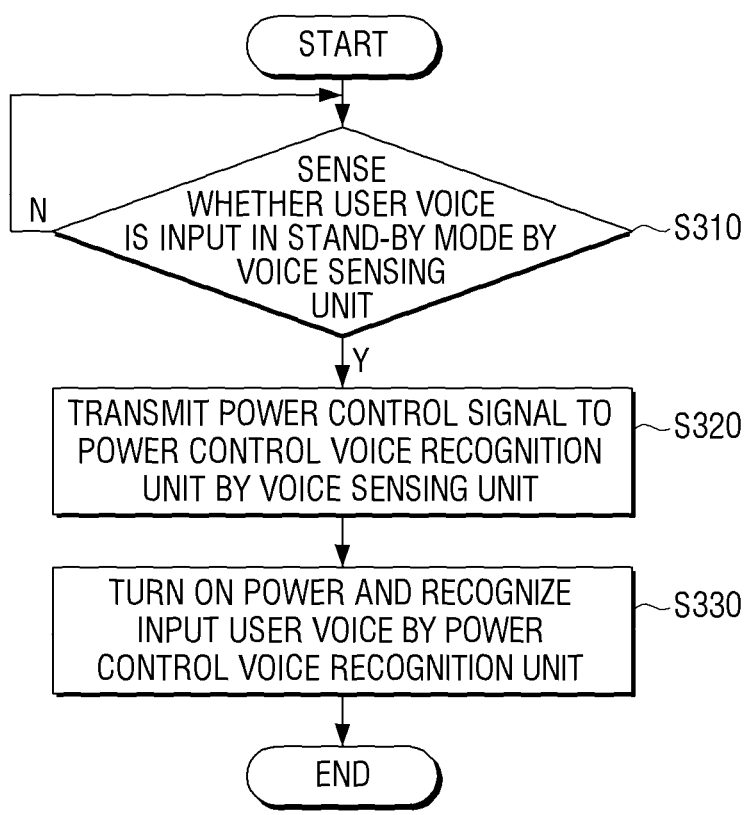
FIG. 3 is a flowchart to explain a power controlling method of an electronic apparatus according to an exemplary embodiment.

FIG. 3 is a flowchart to explain a power controlling method of an electronic apparatus according to an exemplary embodiment.

In the stand-by mode of the electronic apparatus 100, the voice sensing unit 121 senses whether a user voice is input (operation S310). For example, in the stand-by mode of the electronic apparatus 100, the voice sensing unit 121 may determine whether a user voice is input by comparing the volume of an input audio with the volume of the previously-input audio. That is, if an audio received through the voice input unit 110 increases by more than a predetermined value in comparison with the previously-input audio, the voice sensing unit 121 may determine that a user voice is input.

If the voice sensing unit 121 senses that a user voice is input (operation S310-Y), the voice sensing unit 121 transmits a power control signal to the power control recognition unit 122 (operation S320).

If a power control signal is transmitted from the voice sensing unit 121, the power control voice recognition unit 122 is turned on and recognizes the input user voice (operation S330). If the power control voice recognition unit 122 determines that the input user voice is to control the power of the electronic apparatus 100, the power control voice recognition unit 122 may transmit a power control signal to the main control unit 150. The main control unit 150 may convert the stand-by mode of the electronic apparatus 100 into an operation mode.

As described above, the voice sensing unit 121 of the power control unit 120 is turned on while the power control voice recognition unit 122 and the main control unit 150 are turned off in the stand-by mode and thus, the electronic apparatus 100 may prevent power from being wasted unnecessarily.

Figure 4:
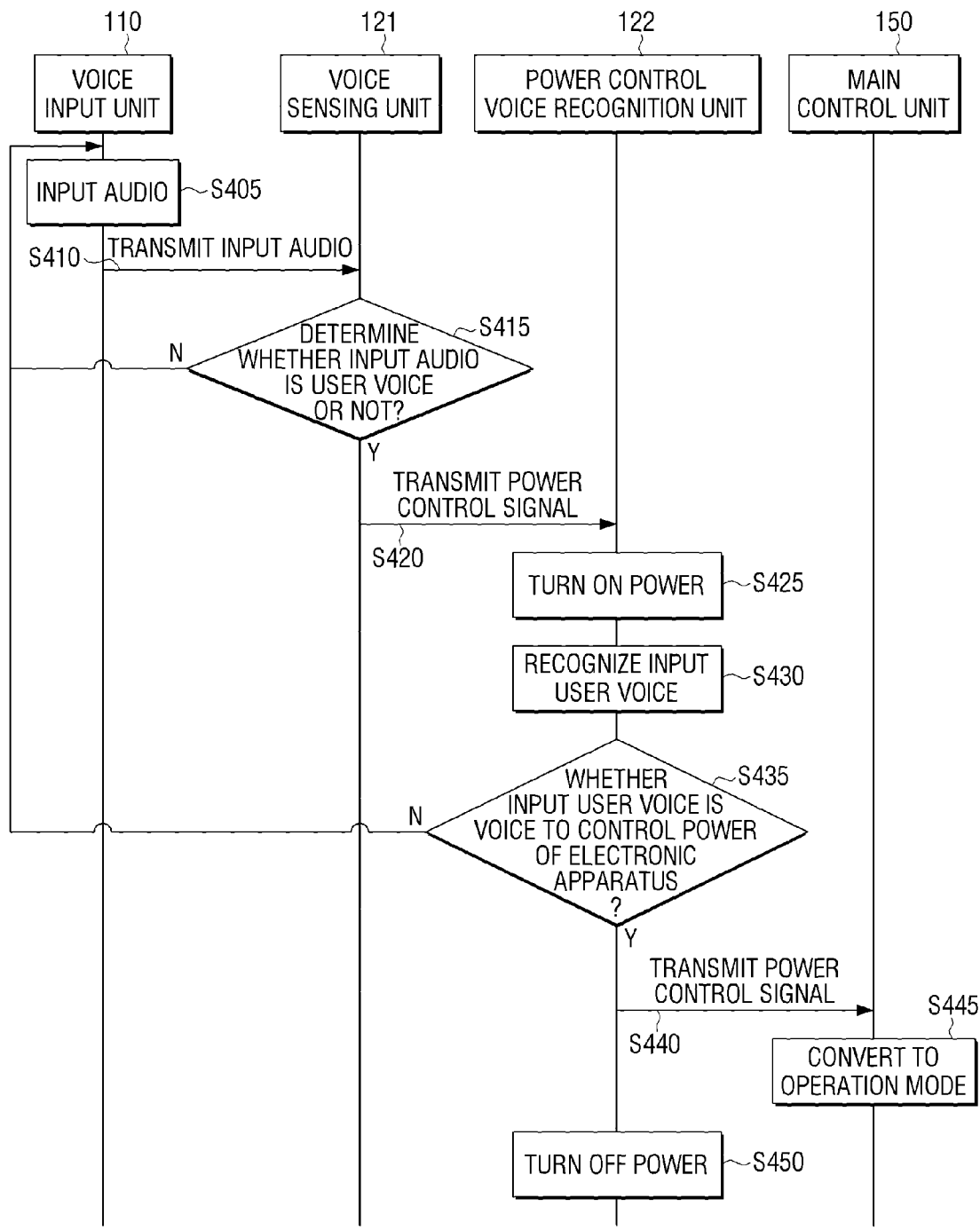
FIG. 4 is a flowchart to explain a power controlling method of an electronic apparatus in a stand-by mode in detail according to an exemplary embodiment.

FIG. 4 is a flowchart to explain a power controlling method of an electronic apparatus in a stand-by mode in detail according to an exemplary embodiment.

The voice input unit 110 receives an external audio input (operation S405) and transmits the input audio to the voice sensing unit 121 (operation S410).

The voice sensing unit 121 determines whether the input audio is a user voice or not (operation S415). For example, in the stand-by mode of the electronic apparatus 100, the voice sensing unit 121 may compare the volume of an audio input through the voice input unit 110 with the volume of previously-input audio and determine that a user voice is input if the volume of audio input through the voice input unit 110 increases by more than a predetermined value in comparison with the volume of the previously-input audio.

If it is determined that an input audio is a user voice (operation S415-Y), the voice sensing unit 121 transmits a power control signal (operation S420).

If the power control signal is transmitted from the voice sensing unit 121, the power control voice recognition unit 122 is turned on (operation S425).

Subsequently, the power control voice recognition unit 122 recognizes the input user voice (operation S430). In this case, the power control voice recognition unit 122 may receive the input user voice from at least one of the voice input unit 110 and the voice sensing unit 121.

The power control voice recognition unit 122 determines whether the input user voice is to control the power of the electronic apparatus 100 (operation S435). Specifically, the power control voice recognition unit 122 may determine whether the input user voice is to control the power of the electronic apparatus 100 by determining whether the recognized user voice is consistent with a command (for example, "start" and "turn-on") stored in a voice database to turn on the power of the electronic apparatus 100.

If the input user voice is to control the power of the electronic apparatus 100 (operation S435-Y), the power control voice recognition unit 122 transmits a power control signal to the main control unit 150 (operation S440).

If the power control signal is transmitted from the power control voice recognition unit 122, the main control unit 150 converts the stand-by mode of the electronic apparatus 100 into an operation mode (operation S445).

If the mode of the electronic apparatus 100 is converted into the operation mode, the power control voice recognition unit 122 may be turned off again (operation S450).

However, if the input user voice is not a voice to control the power of the electronic apparatus 100 (operation S435-N), the power control voice recognition unit 122 is turned off again and waits for a user voice to control the power to be input.

As described above, the power of an electronic apparatus may be controlled using voice recognition and thus, a user may control the power more easily and conveniently. In addition, as power of the power control voice recognition unit is turned on when a user voice is recognized through the voice sensing unit in the stand-by mode, unnecessary power consumption in the stand-by mode may be prevented.

A program code for performing the above-mentioned methods may be stored in a non-transitory recording medium readable by a computer. The recording medium includes hard disk, removable disk, memory card, USB memory, CD-ROM, optical media, etc., which can be readable by a terminal. Moreover, it is understood that in exemplary embodiments, one or more units of the above-described apparatus 100 can include circuitry, a processor, a microprocessor, etc., and may execute a computer program stored in a computer-readable medium.

Although a few exemplary embodiments have been shown and described, it would be appreciated by those skilled in the art that changes may be made in these exemplary embodiment without departing from the principles and spirit of the invention, the scope of which is defined in the claims and their equivalents.

What is claimed is:

1. An electronic apparatus, comprising:
  a voice input unit which receives an audio input in a stand-by mode of the electronic apparatus;
  a voice sensing unit which determines whether the received audio input is a user voice, and outputs a first power control signal in response to determining that the received audio input is the user voice;
  a power control voice recognition unit which, in response to receiving the first power control signal from the voice sensing unit, turns on and performs voice recognition regarding the received audio input; and
  a main control unit which controls the electronic apparatus,
  wherein the power control voice recognition unit determines whether the received audio input is to control power of the electronic apparatus,
  wherein the power control voice recognition unit transmits a second power control signal to apply power to the main control unit in response to determining that the received audio input is to control the power of the electronic apparatus,
  wherein the main control unit converts a mode of the electronic apparatus from the stand-by mode into an operation mode in response to receiving the second power control signal from the power control voice recognition unit, and wherein the main control unit is turned on by the second power control signal only when the power control recognition unit is turned on by the first power control signal.

2. The apparatus as claimed in claim 1, wherein the power control voice recognition unit turns off after a predetermined time elapses upon determining that the received audio input is to control the power of the electronic apparatus.

3. The apparatus as claimed in claim 1, further comprising:
a main voice recognition unit which recognizes a user voice received through the voice input unit in the operation mode of the electronic apparatus,
wherein the main control unit controls the electronic apparatus according to the user voice recognized through the main voice recognition unit in the operation mode of the electronic apparatus.

4. The apparatus as claimed in claim 1, wherein the power control voice recognition unit turns off if a user voice is not received for a predetermined time upon determining that the received audio input is not to control the power of the electronic apparatus.

5. The apparatus as claimed in claim 1, wherein the power control voice recognition unit stores only a command corresponding to a user voice to control the power of the electronic apparatus.

6. The apparatus as claimed in claim 1, wherein the voice sensing unit determines that the received audio input is the user voice in response to a volume of the received audio input increases by more than a predetermined value in comparison with a volume of a previously-input audio.

7. The apparatus as claimed in claim 1, wherein the voice input unit and the voice sensing unit are turned on in the stand-by mode of the electronic apparatus and the power control voice recognition unit is turned off in the stand-by mode of the electronic apparatus.

8. A method for controlling power of an electronic apparatus, the method comprising:
determining, by a voice sensing unit of the electronic apparatus, whether a received audio input to a voice input unit of the electronic apparatus in a stand-by mode is a user voice;
in response to determining that the received audio input is the user voice, transmitting, by the voice sensing unit, a first power control signal to a power control voice recognition unit of the electronic apparatus; and
in response to receiving the first power control signal from the voice sensing unit, turning on the power control voice recognition unit and performing voice recognition regarding the received audio input,
wherein the performing the voice recognition comprises determining whether the received audio input is to control the power of the electronic apparatus,
wherein the method further comprises:
in response to determining that the received audio input is to control the power of the electronic apparatus, transmitting a second power control signal to apply power to a main control unit of the electronic apparatus, and
in response to receiving the second power control signal, converting, by the main control unit, a mode of the electronic apparatus from the stand-by mode to an operation mode, and wherein the main control unit is turned on by the second power control signal only when the power control recognition unit is turned on by the first power control signal.

9. The method as claimed in claim 8, further comprising:
in response to a predetermined time elapsing upon determining that the received audio input is to control the power of the electronic apparatus, turning off the power control voice recognition unit.

10. The method as claimed in claim 8, further comprising:
controlling, by the main control unit, the electronic apparatus according to a user voice recognized through a main voice recognition unit of the electronic apparatus in the operation mode.

11. The method as claimed in claim 8, further comprising:
in response to a user voice not being received for a predetermined time upon determining that the received audio input is not to control the power of the electronic apparatus, turning off the power control voice recognition unit.

12. The method as claimed in claim 8, wherein the power control voice recognition unit stores only a command corresponding a user voice to control the power of the electronic apparatus.

13. The method as claimed in claim 8, wherein the determining comprises determining that the received audio input is the user voice in response to a volume of the received audio input increases by more than a predetermined value in comparison with a volume of a previously-input audio.

14. The method as claimed in claim 8, wherein only the voice input unit and the voice sensing unit are turned on in the stand-by mode of the electronic apparatus and the power control voice recognition unit is turned off in the stand-by mode of the electronic apparatus.

15. A computer readable recording medium having recorded thereon a program executable by a computer for performing the method of claim 8.

16. A method for controlling power of an electronic apparatus, the method comprising:
in response to determining that a received audio input corresponds to a predetermined sound, powering a power control voice recognition unit of the electronic apparatus; and
in response to the powering of the power control voice recognition, performing voice recognition regarding the received audio input,
wherein the performing the voice recognition comprises determining whether the received audio input is to control the power of the electronic apparatus,
wherein the method further comprises, in response to determining that the received audio input is to control the power of the electronic apparatus, applying power to a main control unit of the electronic apparatus to convert a mode of the electronic apparatus from the stand-by mode to an operation mode, and
wherein the main control unit is turned on by the second power control signal only when the power control recognition unit is turned on by the first power control signal.

17. A computer readable recording medium having recorded thereon a program executable by a computer for performing the method of claim 16.

* * * * *